(12) United States Patent
He et al.

(10) Patent No.: US 11,787,405 B1
(45) Date of Patent: Oct. 17, 2023

(54) ACTIVE COASTING IN TRAFFIC

(71) Applicant: PlusAI, Inc., Santa Clara, CA (US)

(72) Inventors: Chaozhe He, Clarence Center, NY (US); Mohammadhussein Rafieisakhaei, Foster City, CA (US); Xiaoyu Huang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/109,783

(22) Filed: Feb. 14, 2023

(51) Int. Cl.
*B60W 30/18* (2012.01)
*B60W 50/00* (2006.01)

(52) U.S. Cl.
CPC .. *B60W 30/18072* (2013.01); *B60W 50/0097* (2013.01); *B60W 2520/10* (2013.01); *B60W 2554/4041* (2020.02); *B60W 2554/4042* (2020.02)

(58) Field of Classification Search
CPC ....... B60W 30/18072; B60W 50/0097; B60W 2520/10; B60W 2554/4041; B60W 2554/4042
See application file for complete search history.

(56) References Cited

U.S. PATENT DOCUMENTS

| | | | | |
|---|---|---|---|---|
| 2013/0096792 | A1* | 4/2013 | Maier | B60W 40/105 701/1 |
| 2018/0149212 | A1* | 5/2018 | Huh | B60W 10/08 |
| 2019/0100209 | A1* | 4/2019 | Plianos | B60W 50/14 |
| 2020/0164879 | A1* | 5/2020 | Lee | B60W 10/10 |

* cited by examiner

*Primary Examiner* — James M McPherson
*Assistant Examiner* — Kyle J Kingsland
(74) *Attorney, Agent, or Firm* — Sheppard Mullin Richter & Hampton LLP

(57) ABSTRACT

Methods, systems, and non-transitory computer readable media configured to perform operations comprise determining, by a computing system, speeds and stations of a plurality of leading vehicles traveling ahead of an ego vehicle; calculating, by the computing system, a coasting viability factor based on the speeds and stations of the plurality of leading vehicles and a speed and station of the ego vehicle; comparing, by the computing system, the coasting viability factor to a coasting viability threshold; and determining, by the computing system, whether the ego vehicle should coast based on the comparing.

20 Claims, 13 Drawing Sheets

ACTIVE COASTING IN TRAFFIC

FIELD OF THE INVENTION

The present technology relates to autonomous systems. More particularly, the present technology relates to vehicle coasting.

BACKGROUND

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change. For example, control of longitudinal movement of the vehicle through application of throttle or through coasting can be subject to the position and movement of other vehicles.

SUMMARY

Various embodiments of the present technology can include methods, systems, and non-transitory computer readable media configured to perform operations comprising determining, by a computing system, speeds and stations of a plurality of leading vehicles traveling ahead of an ego vehicle; calculating, by the computing system, a coasting viability factor based on the speeds and stations of the plurality of leading vehicles and a speed and station of the ego vehicle; comparing, by the computing system, the coasting viability factor to a coasting viability threshold; and determining, by the computing system, whether the ego vehicle should coast based on the comparing.

In some embodiments, calculating the coasting viability factor comprises: calculating a time-station profile based on the speeds and stations of the plurality of leading vehicles and the speed and station of the ego vehicle, the time-station profile representing stations and speeds of the plurality of leading vehicles at a predetermined future time.

In some embodiments, calculating the coasting viability factor further comprises: calculating target points for the ego vehicle, the target points representing predicted coasting speeds for the ego vehicle at the stations of the plurality of leading vehicles at the predetermined future time.

In some embodiments, calculating the coasting viability factor further comprises: calculating a station-speed profile based on the time-station profile; and calculating the coasting viability factor based on the station-speed profile.

In some embodiments, calculating the station-speed profile based on the time-station profile comprises: calculating a coasting profile for the ego vehicle based on a current speed of the ego vehicle, wherein the coasting profile represents predicted coasting speeds of the ego vehicle as a function of stations of the ego vehicle.

In some embodiments, calculating the station-speed profile further comprises: calculating a coasting function for each of the target points as a function of the station of the target point and a difference between the speed for the target point and a predicted coasting speed of the ego vehicle at the station of the target point.

In some embodiments, calculating the coasting viability factor further comprises: calculating a coasting function for each of the target points as a function of a confidence interval for the station of the target point.

In some embodiments, calculating the coasting viability factor further comprises: calculating a sum of the coasting functions.

In some embodiments, determining whether the ego vehicle should coast comprises: determining the ego vehicle should coast when the sum of the coasting functions does not exceed a coasting viability threshold.

Some embodiments comprise responsive to determining the ego vehicle should coast, causing, by the computing system, the ego vehicle to coast.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
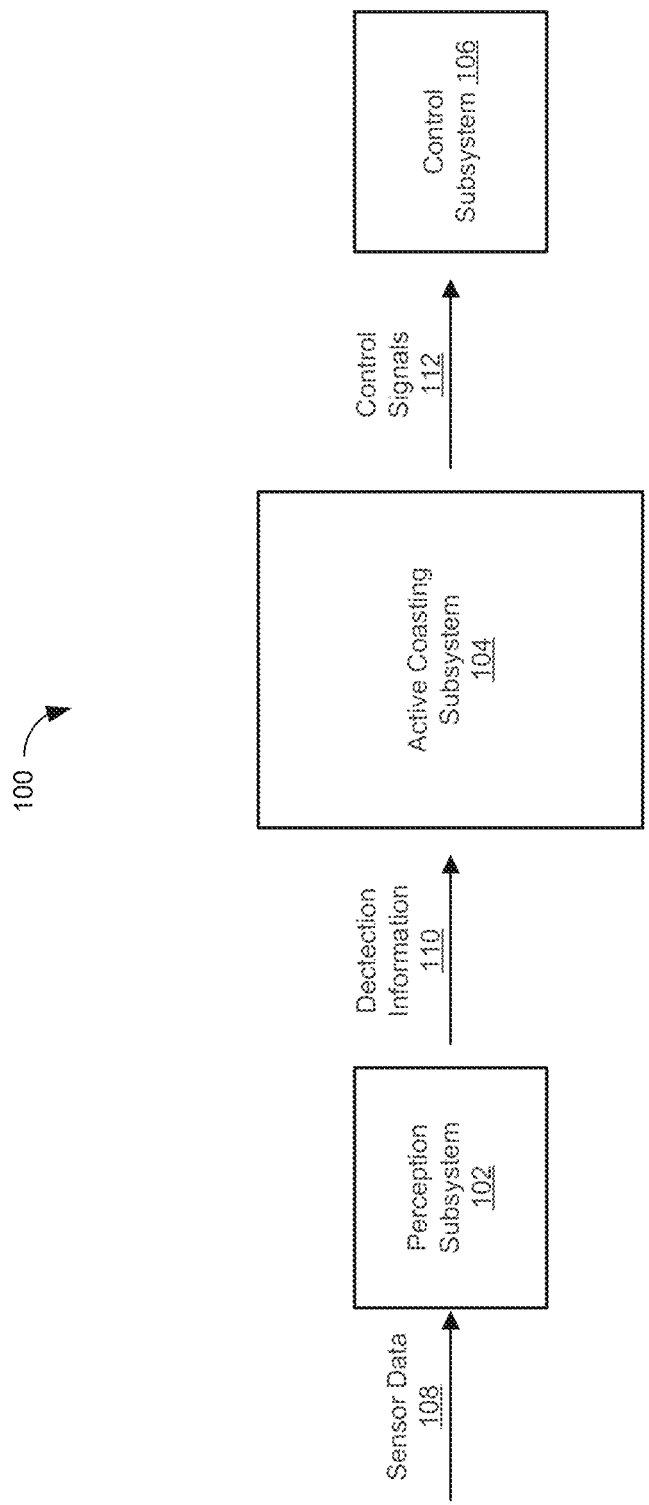
FIG. 1 illustrates an example simplified functional block diagram of a system 100 to facilitate active coasting in traffic, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Active Coasting in Traffic

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change.

Understanding an environment in which an ego vehicle having an autonomous system of navigation is traveling is fundamental to planning and control functions of the ego vehicle. For example, a truck traveling in an environment can plan a safe route to travel in the environment based on an understanding of the environment. The understanding of the environment can involve, for example, identifying objects such as other vehicles, pedestrians, traffic signals, etc. The understanding of the environment can also involve, for example, determining a drivable area (e.g., road surface) of the environment and various boundaries (e.g., lane boundaries, road curbs, road shoulders). In many cases, an ego vehicle relies on machine learning models to facilitate understanding of an environment in which the ego vehicle is traveling and to accordingly control the ego vehicle. For example, a truck can rely on a machine learning model to determine whether to apply throttle or to coast in a particular environment, such as a road condition involving traffic.

However, under conventional approaches, determination of when the ego vehicle should coast in traffic poses various technological challenges. In some conventional approaches, multiple vehicles traveling ahead of the ego vehicle are treated as a single vehicle. In other conventional approaches, multiple vehicles are treated as independent vehicles, although vehicles in the same lane may share behavior similarities and reactive motions, that is, the follower may copy the same speed profile as the lead to stay in lane safely. However, these approaches fail to account for variability among the vehicles in their individual movements. In some conventional approaches, the functions of both tracking the vehicles traveling ahead of the ego vehicle and determining whether the ego vehicle should coast are combined into a single function. However, this approach does not recognize the potential independence of these two functions or allow these two functions to be implemented in different ways.

The present technology provides improved approaches for active coasting in traffic that overcome the aforementioned and other technological challenges. In various embodiments, the present technology can determine whether an ego vehicle may coast in traffic. The ego vehicle may determine the speeds and stations of a plurality of leading vehicles traveling ahead of the ego vehicle. As used herein, a "station" is a position along the path of the ego vehicle. Based on the determined speeds and stations of the leading vehicles, target points may be calculated. Each target point may represent an estimated vehicle speed at which the ego vehicle will reach a station of one of the leading vehicles. A coasting profile may be calculated that represents estimated speeds and stations of the ego vehicle if the ego vehicle began to coast. The target points may be compared to the coasting profile. If there is a close match between the target points and the coasting profile, the ego vehicle should coast. In some embodiments, determining whether there is a close match between the target points and the coasting profile includes calculating a coasting viability factor and comparing the coasting viability factor to a coasting viability threshold. When the coasting viability factor does not exceed the coasting viability threshold, the ego vehicle should coast. The present technology also can apply when an ego vehicle is led by only one leading vehicle rather than multiple leading vehicles, as discussed in more detail herein.

In some embodiments, the coasting viability factor may be calculated for the ego vehicle based on the target points and the coasting profile. For example, the coasting viability factor may be calculated by calculating coasting functions for the plurality of leading vehicles, and calculating a sum of those coasting functions. Determining whether the ego vehicle should coast in traffic may include comparing the coasting viability factor to a coasting viability threshold. For example, when the sum of the coasting functions does not exceed the coasting viability threshold, the ego vehicle should coast. These and other inventive features and related advantages of the various embodiments of the present technology are discussed in more detail herein.

FIG. 1 illustrates an example simplified functional block diagram of a system 100 to facilitate active coasting in traffic, according to embodiments of the present technology. The system 100 may include a perception subsystem 102, an active coasting subsystem 104, and a control subsystem 106.

In the system 100, sensor data 108 can be acquired. The sensor data 108 can be data describing an environment in which an ego vehicle is positioned. For example, the sensor data 108 can describe other vehicles and their movements in the surroundings of the ego vehicle. The sensor data 108 can be data captured or collected by various types of sensors. In some embodiments, the sensors can be some or all sensors available in an advanced driver assisted system (ADAS). For example, the sensor data 108 can be provided by a camera system (e.g., based on visible light, near infrared light, infra-red light), a radar system, and a lidar system. In other examples, the sensor data 108 can be provided by a camera system alone, a radar system alone, or a lidar system alone. In some embodiments, some or all of the sensor data 108 can be captured by sensors mounted on the ego vehicle for which the system 100 is implemented. In some embodiments, a portion of the sensor data 108 can be captured by other vehicles in a fleet to which the ego vehicle belongs.

The sensor data 108 can be provided to the perception subsystem 102. The perception subsystem 102 can process and analyze the sensor data 108 to detect various types of objects (e.g., vehicles and other obstacles) and their behavior in the environment of the ego vehicle. For example, one or more machine learning models can be trained to detect vehicles traveling ahead of the ego vehicle as well as support determination of their stations and speeds based on the sensor data 108. Such information can be included in detection information 110 that is generated by the perception subsystem 102 and provided to the active coasting subsystem 104.

The active coasting subsystem 104 may generate control signals 112 based on the detection information 110. For example, based on the detection information 110, the active coasting subsystem 104 may decide the ego vehicle should coast in traffic. Further, based on that decision, the active coasting subsystem 104 may generate control signals 112 that cause the ego vehicle to coast.

In some embodiments, the active coasting subsystem 104 can provide support for various functions of an autonomous system of navigation of any type of vehicle, such as an autonomous vehicle. The control signals 112 can support or be implemented as part of a control function of an autonomous system of a vehicle, such as a control module 1818 of an autonomous system 1810 of FIG. 18, as discussed in more detail below. The active coasting subsystem 104 can generate the control signals 112 based on various machine learning methodologies. For example, the active coasting subsystem 104 can utilize a trained machine learning model to generate the control signals 112 based on the detection information 110.

In some embodiments, some or all of the functionality performed by the active coasting subsystem 104 may be performed by one or more computing systems implemented in a vehicle. In some embodiments, some or all of the functionality performed by the active coasting subsystem 104 may be performed by one or more computing systems. In some embodiments, some or all of the functionality performed by the active coasting subsystem 104 may be performed by one or more backend computing systems (e.g., remote from a vehicle). In some embodiments, some or all of the functionality performed by the active coasting subsystem 104 may be performed by one or more computing systems associated with (e.g., carried by) one or more users riding in a vehicle. In some embodiments, some or all data processed and/or stored by the active coasting subsystem 104 can be stored in a data store (e.g., local to the active coasting subsystem 104) or other storage system (e.g., cloud storage remote from the active coasting subsystem 104). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the active coasting subsystem 104 can be implemented in any suitable combinations. Functionalities of the active coasting subsystem 104 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Figure 2:
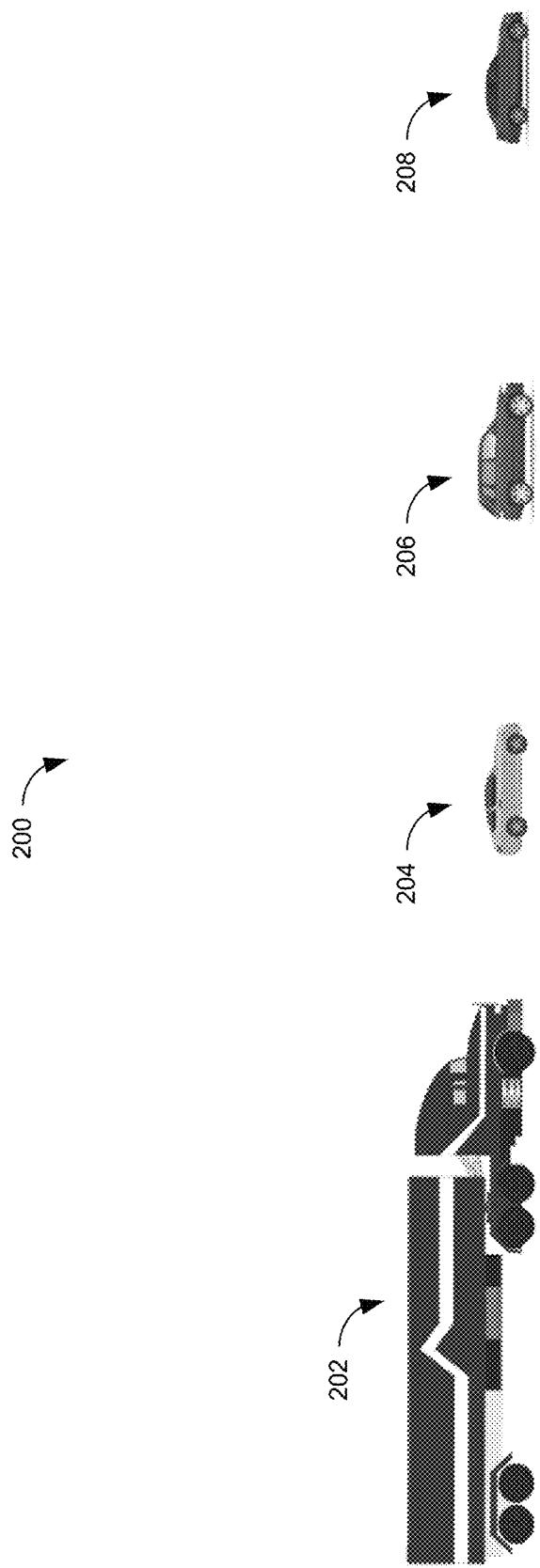
FIG. 2 illustrates a scenario where an ego vehicle is being led by a plurality of other vehicles.

FIG. 2 illustrates a scenario 200 where an ego vehicle 202 is led by a plurality of lead vehicles. The ego vehicle 202 is led by a first lead vehicle 204, which is led by a second lead vehicle 206, which is led by a third lead vehicle 208. Although the scenario 200 includes three lead vehicles in an example, it should be understood that the present technology applies to other numbers of lead vehicles as well. Some embodiments apply to a scenario having only one lead vehicle, as described in detail herein.

Figure 3:
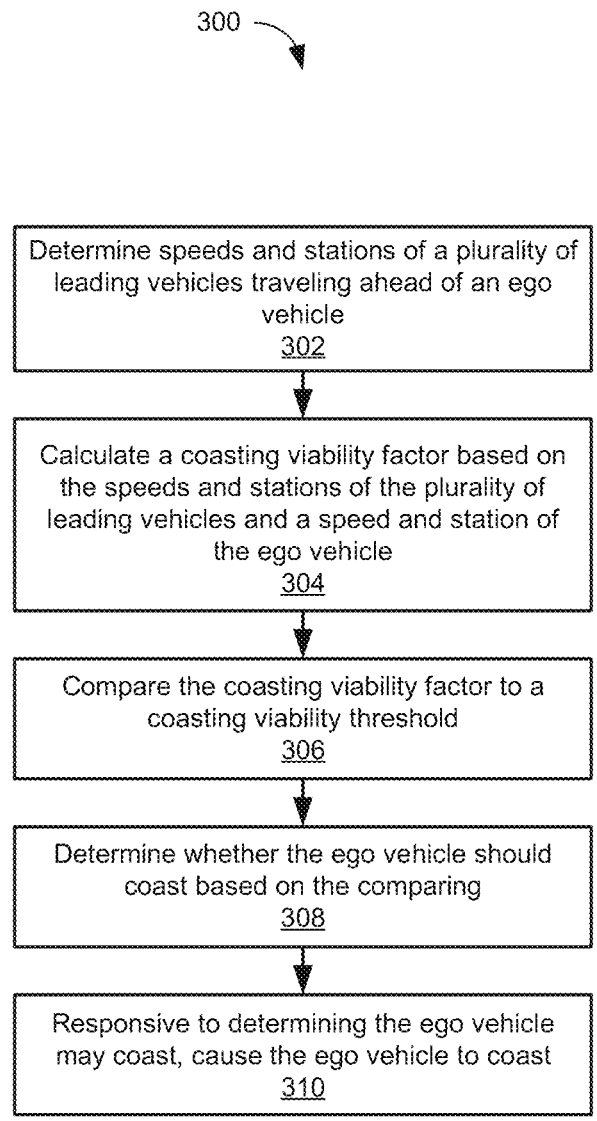
FIG. 3 illustrates an example method associated with active coasting in traffic, according to some embodiments of the present technology.

FIG. 3 illustrates an example method 300 associated with active coasting in traffic, according to some embodiments of the present technology. The various functionality described herein for active coasting in traffic can be performed by, for example, the active coasting subsystem 104 of FIG. 1. It should be understood that there can be additional, fewer, or alternative blocks, functionality, or steps performed in similar or alternative orders, or in parallel, based on the various features and embodiments discussed herein unless otherwise stated.

At block 302, the method 300 may include determining speeds and stations of a plurality of leading vehicles traveling ahead of an ego vehicle. The sensor data 108 representing these speeds and stations may be collected by sensors. The sensors may be mounted on the ego vehicle, on other vehicles, or near the road on which the ego vehicle is traveling. The sensor data 108 may be provided to the perception subsystem 102. The perception subsystem 102 may determine these speeds and stations based on the sensor data 108, and may provide data representing these speeds and stations to the active coasting subsystem 104 as part of the detection information 110.

At block 304, the method 300 may include calculating a coasting viability factor based on the speeds and stations of the plurality of leading vehicles and a speed and station of the ego vehicle. Calculating the coasting viability factor may include calculating a time-station profile based on the speeds and stations of the plurality of leading vehicles and the speed and station of the ego vehicle. The time-station profile may represent stations and speeds of the plurality of leading vehicles at a predetermined future time.

Figure 4:
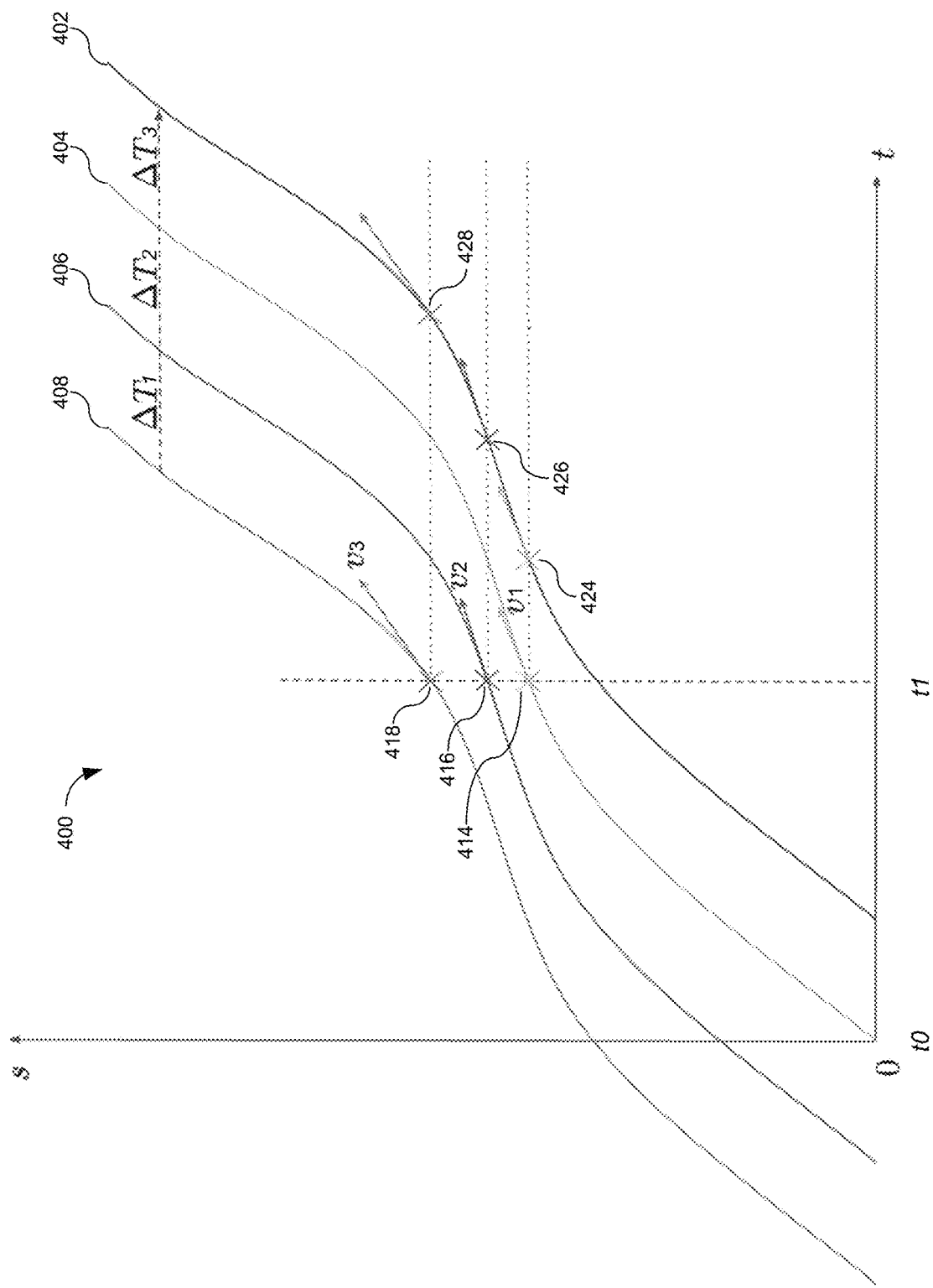
FIG. 4 illustrates an example time-station profile for the scenario of FIG. 2, according to some embodiments of the present technology.

FIG. 4 illustrates an example time-station profile 400 for the scenario 200 of FIG. 2, according to some embodiments of the present technology. Referring to FIG. 4, time t is represented by the horizontal axis, while station s is represented by the vertical axis. The example time-station profile 400 includes four curves 402, 404, 406, and 408 representing ego vehicle 202 and lead vehicles 204, 206, and 208, respectively. The predetermined time is indicated as t1. The curve 404 of the first lead vehicle 204 may be taken to intersect the origin of the example time-station profile 400, at time t0. The other curves 402, 406, and 408 may be determined by shifting the curve 404 of the first lead vehicle 204 along the horizontal axis by intervals $\Delta T1$, $\Delta T2$, and $\Delta T3$, which may be different values. These intervals may be intervals between the times at which the vehicles pass a particular station.

Calculating the coasting viability factor may further include calculating target points for the leading vehicles.

The target points may represent estimated vehicle speeds at which the ego vehicle will arrive at the stations of the plurality of leading vehicles determined at time t1. The target points may be determined by projecting the stations of the lead vehicles at time t1 forward in time onto the curve 402 of the ego vehicle 202. Referring again to FIG. 4, the stations of the lead vehicles 204, 206, 208 at time t1 are shown at 414, 416, 418, respectively, and their projections onto the curve 402 of the ego vehicle 202 (that is, the target points of the ego vehicle 202) are shown at 424, 426, 428, respectively. Also shown are vectors v1, v2, v3 representing speeds at time t1 for the lead vehicles 204, 206, 208, respectively. Each target point represents a time t and station s of a vehicle. From each curve, a speed may be derived for any point on the curve. Note the speeds for the vehicles may be the same at any particular station as the slopes of the curves are the same at those points. For example, the speed of the ego vehicle 202 at point 424 may be the same as the speed of lead vehicle 204 at point 414, the speed of the ego vehicle 202 at point 426 may be the same as the speed of lead vehicle 206 at point 416, and the speed of the ego vehicle 202 at point 428 may be the same as the speed of lead vehicle 208 at point 418.

Figure 5:
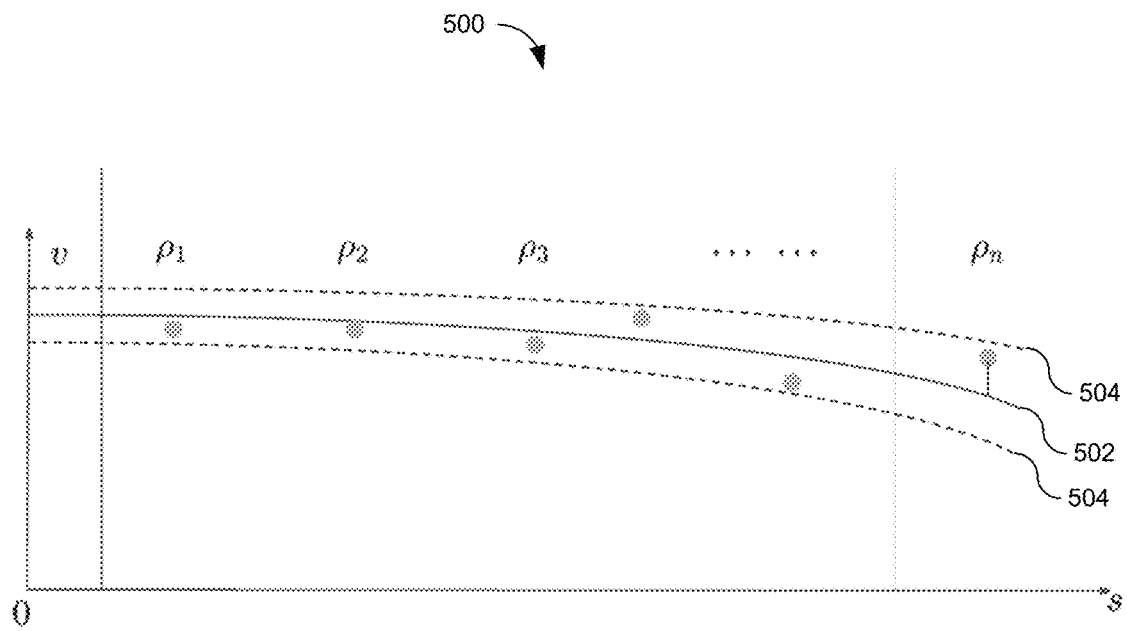
FIG. 5 illustrates an example station-speed profile for the scenario of FIG. 2, according to some embodiments of the present technology.

Calculating the coasting viability factor may further include calculating a station-speed profile based on the time-station profile, and calculating the coasting viability factor based on the station-speed profile. FIG. 5 illustrates an example station-speed profile 500 for the scenario 200 of FIG. 2, according to some embodiments of the present technology. Referring to FIG. 5, station s is represented by the horizontal axis, while speed v is represented by the vertical axis.

Calculating the station-speed profile may include calculating a coasting profile for the ego vehicle based on a current speed of the ego vehicle. The coasting profile may represent predicted coasting speeds of the ego vehicle as a function of stations of the ego vehicle. Referring to FIG. 5, the coasting profile for the ego vehicle is shown by line 502. The target points are labeled as ρ1, ρ2, and ρ3 through ρn.

Figure 6:
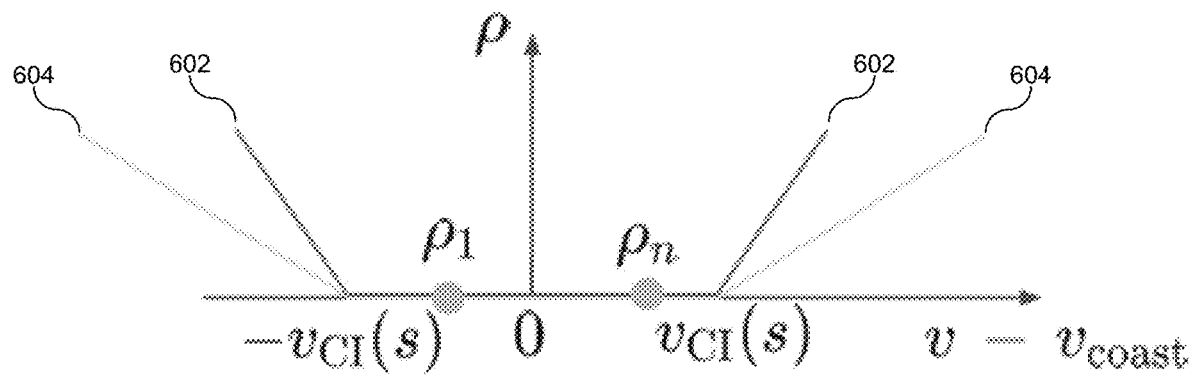
FIG. 6 illustrates two example coasting functions, according to some embodiments of the present technology.

Calculating the coasting viability factor may further include calculating a coasting function for each of the target points. The coasting function for a target point may be a function of the station of the target point and a difference between the speed at the station for the target point and a predicted coasting speed of the ego vehicle at the station for the target point. Calculating the coasting viability factor may further include calculating a coasting function for each of the target points as a function of a confidence interval for the station of the target point. FIG. 6 illustrates two example coasting functions 602 and 604 for the target points ρ1 and ρn, respectively, according to some embodiments of the present technology. Referring to FIG. 6, the value of the coasting function ρ is represented by the vertical axis, while a speed difference $v-v_{coast}$ is represented by the horizontal axis, where v is the speed of the ego vehicle at the station of the corresponding target point in the time-station profile, and $v_{coast}$ is the speed of the ego vehicle at that station in the coasting profile. The different slopes of the coasting functions 602 and 604 reflect the greater uncertainties of predictions for stations further from the ego vehicle. The confidence interval is illustrated graphically in FIG. 5 by broken lines 504.

Calculating the coasting viability factor may further include calculating a sum of the coasting functions, for example as shown in equation (1).

$$\rho_{coast} = \sum_{i=1}^{n} \rho_i \quad (1)$$

Referring again to FIG. 3, at block 306, the example method 300 may include comparing the coasting viability factor to a coasting viability threshold. At block 308, the example method 300 may further include determining whether the ego vehicle should coast based on the comparing. For example, the ego vehicle should coast when the sum of the coasting functions does not exceed a coasting viability threshold, as shown in equation (2).

$$\rho_{coast} \leq \rho_{threshold} \quad (2)$$

It should be understood that the parameters and variables illustrated in FIG. 6, as well as the shape of the coasting functions 602 and 604, are presented as examples only, and may vary subject to various factors such as tuning.

At block 310, the example method 300 may include, responsive to determining the ego vehicle should coast, causing the ego vehicle to coast. For example, referring again to FIG. 1, the active coasting subsystem 104 may generate control signals 112 that cause the ego vehicle to coast.

The example method 300 may be implemented using different implementations for different parts of the method. For example, in some embodiments, calculating the time-station profile and the station-speed profile may be implemented as a rules-based process. In some embodiments, determining the coasting viability factor may be implemented using trained machine learning models. For example, machine learning models may be trained using known correspondences between predetermined station-speed profiles and resulting coasting viability factors. As another example, machine learning models may be trained using known correspondences between coasting viability factors and resulting coasting decisions. Errors may be penalized. For example, coasting decisions found to be unsafe may be used to train the machine learning model by penalizing those decisions.

Figure 7:
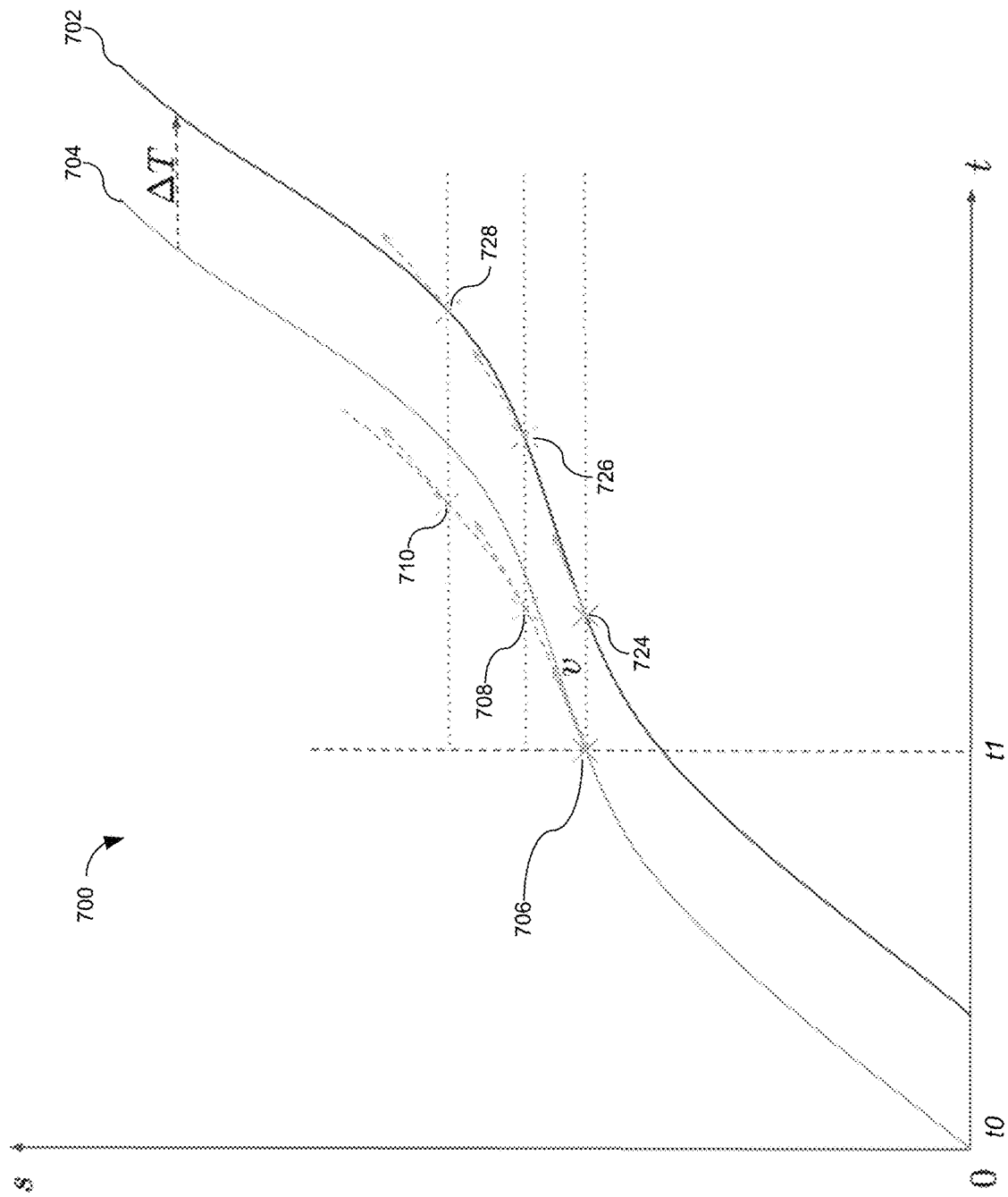
FIG. 7 illustrates an example time-station profile for a scenario where an ego vehicle may be led by only one leading vehicle, according to some embodiments of the present technology.

In some cases, data is available for only one leading vehicle rather than for multiple leading vehicles. For example, an ego vehicle may be led by only one leading vehicle rather than multiple leading vehicles, or other leading vehicles cannot be sensed with high confidence due to blockage and/or other factors. FIG. 7 illustrates an example time-station profile 700 for a scenario where an ego vehicle is led by only one leading vehicle, according to some embodiments of the present technology. Referring to FIG. 7, time t is represented by the horizontal axis, while station s is represented by the vertical axis. The example time-station profile 700 includes two curves 702 and 704 representing the ego vehicle and the single lead vehicle, respectively. The predetermined time is indicated as t1. The curve 704 of the lead vehicle may be taken to intersect the origin of the example time-station profile 700 at time t0. Curve 702 may be determined by shifting the curve 704 of the lead vehicle along the horizontal axis by an interval ΔT.

When multiple leading vehicles are available, calculating the coasting viability factor may include calculating target points for the leading vehicles, for example as described above. But when, as in the present case, only a single lead vehicle is available, target points may be calculated in another manner. For example, the target points may be calculated by determining future stations of the leading vehicle.

Referring to FIG. 7, a first target point 724 may be calculated by projecting the station of the leading vehicle, shown at 706, forward in time onto the curve 702 of the ego vehicle. Using the speed of the leading vehicle at station 706, a station 708 of the lead vehicle at a future time may be predicted, as illustrated by the broken line tangent to the curve 704 and emanating from station 706. A second target point 726 may be calculated by projecting the station 708 of the leading vehicle forward in time onto the curve 702 of the ego vehicle. A third target point 728 may be calculated by predicting another station 710 of the leading vehicle, and projecting that station 710 forward in time onto the curve 702 of the ego vehicle. The calculated target points may be used to calculate a coasting viability factor, for example, as described above.

Figure 8:
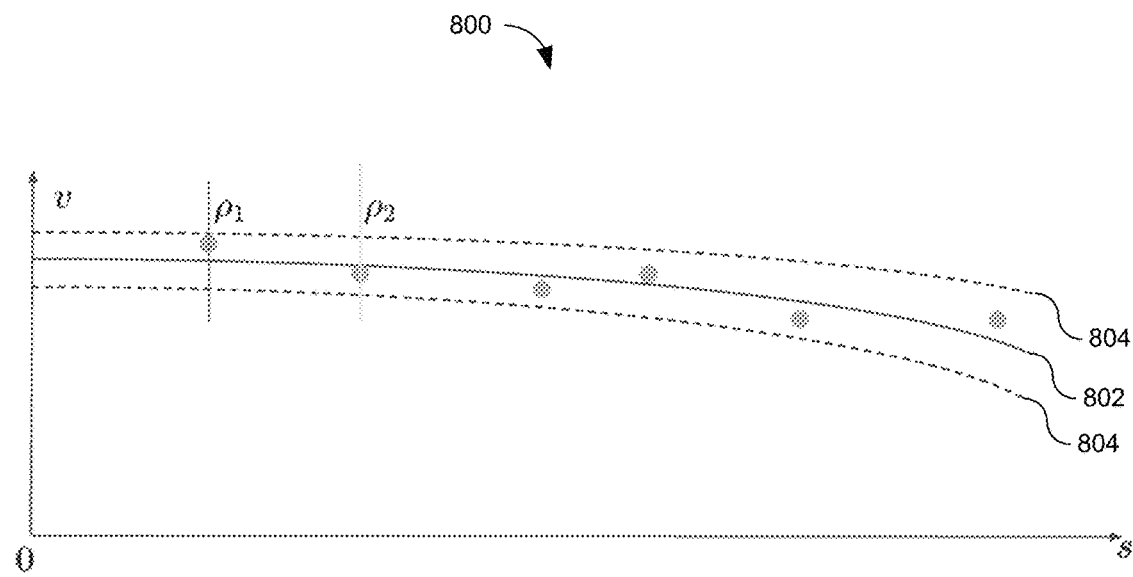
FIGS. 8-9 illustrate an example where target points match closely with an ego vehicle coasting profile, according to some embodiments of the present technology.
Figure 9:
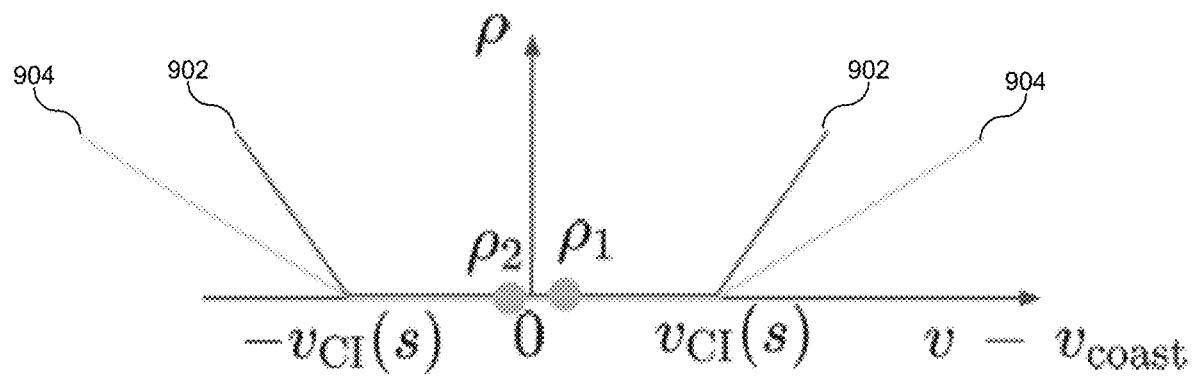

FIGS. 8 and 9 illustrate an example where target points match closely with the ego vehicle coasting profile, according to some embodiments of the present technology. FIG. 8 illustrates a station-speed profile 800 for this example. FIG. 9 illustrates two example coasting functions 902 and 904 for the target points ρ1 and ρ2, respectively. Referring to FIG. 8, all of the target points ρ1 through ρn fall within an envelope 804 defined by an ego vehicle coasting profile 802 and a confidence interval $v_{CI}(s)$. Accordingly, the ego vehicle should coast indefinitely.

Figure 10:
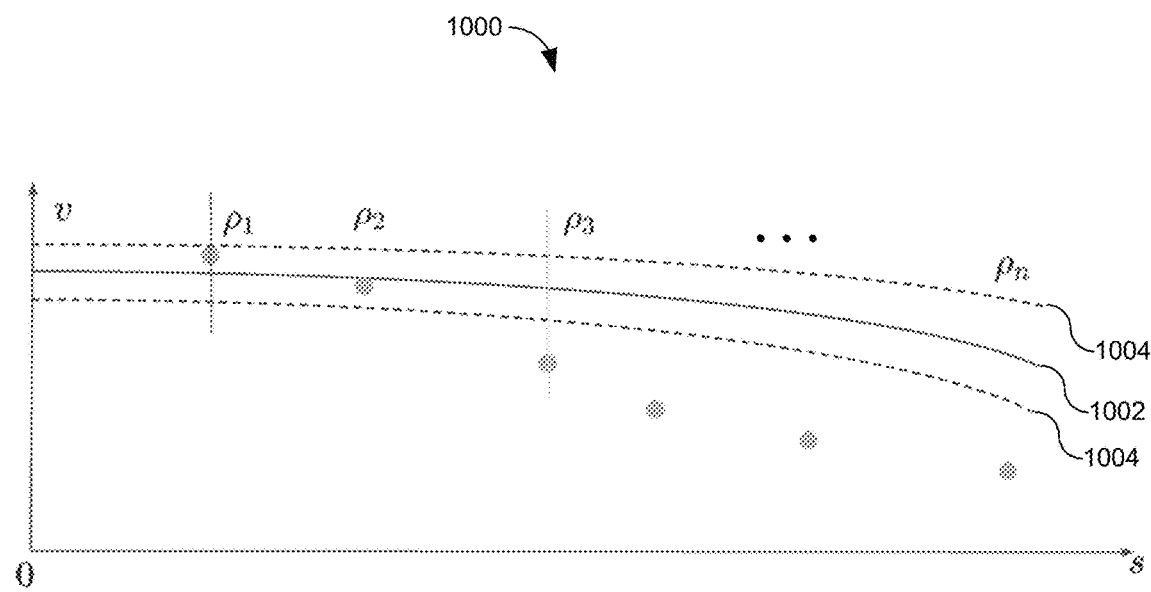
FIGS. 10-11 illustrate an example where target points initially match closely with an ego vehicle coasting profile but then indicate a slowdown, according to some embodiments of the present technology.
Figure 11:
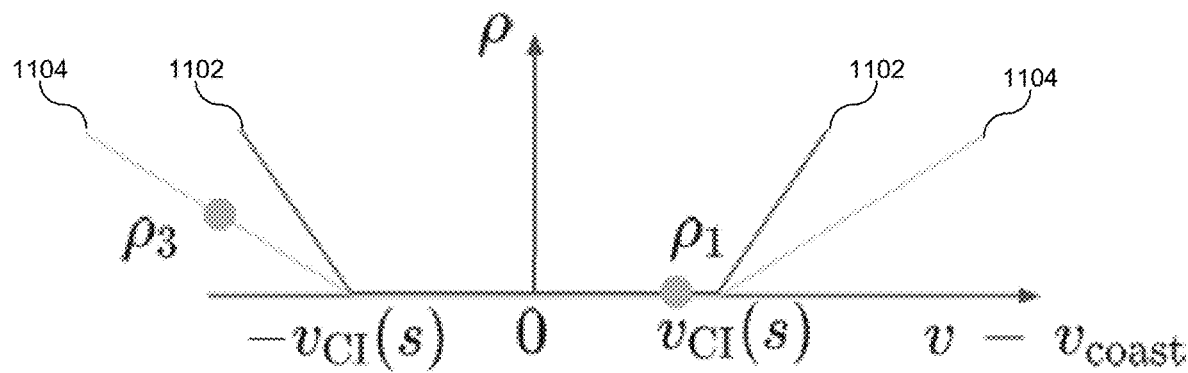

FIGS. 10 and 11 illustrate an example where target points initially match closely with an ego vehicle coasting profile but then indicate a slowdown, according to some embodiments of the present technology. FIG. 10 illustrates a station-speed profile 1000 for this example. FIG. 11 illustrates two example coasting functions 1102 and 1104 for the target points ρ1 and ρ3, respectively. Referring to FIG. 10, only target points ρ1 and ρ2 fall within an envelope 1004 defined by the ego vehicle coasting profile 1002 and a confidence interval $v_{CI}(s)$. Accordingly, the ego vehicle should coast initially, but may have to brake soon.

Figure 12:
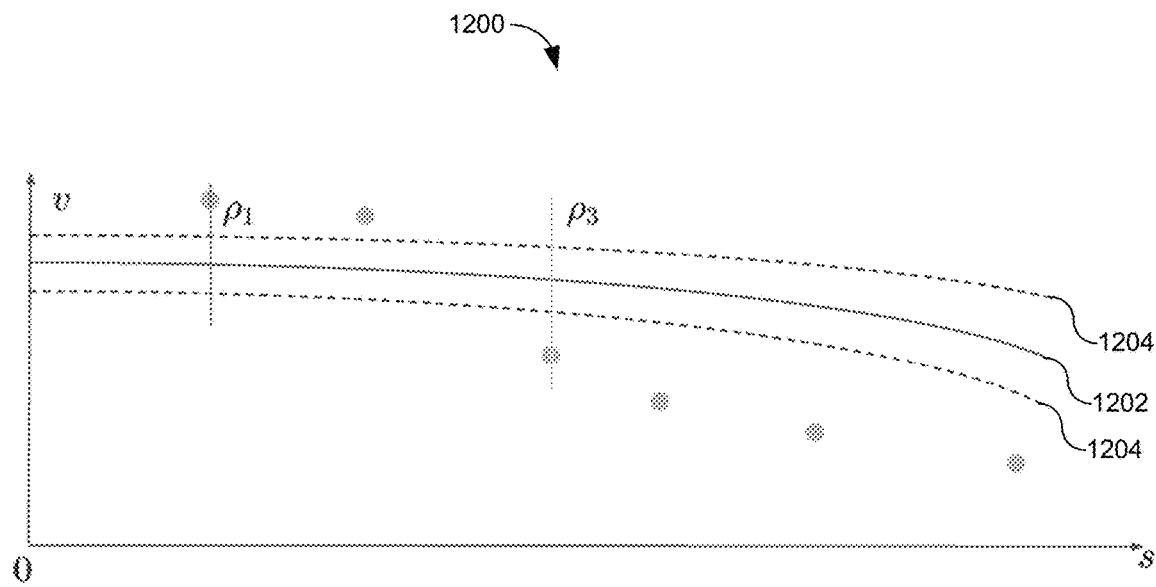
FIGS. 12-13 illustrate an example where target points initially have high speed values followed by low speed values, according to some embodiments of the present technology.
Figure 13:
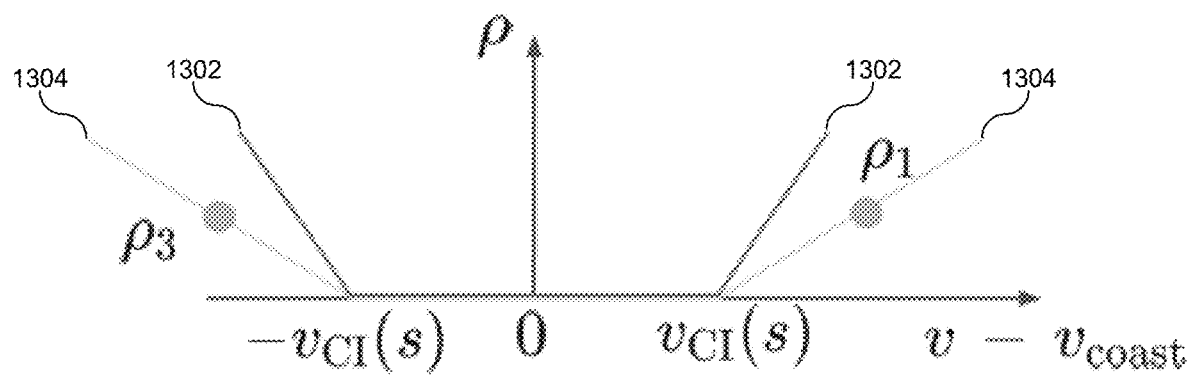

FIGS. 12 and 13 illustrate an example where target points have high speed values followed by low speed values, according to some embodiments of the present technology. FIG. 12 illustrates a station-speed profile 1200 for this example, including an envelope 1204 defined by an ego vehicle coasting profile 1202 and a confidence interval $v_{CI}(s)$. FIG. 13 illustrates two example coasting functions 1302 and 1304 for the target points ρ1 and ρ3, respectively. In this example, the ego vehicle should coast initially, but may have to brake soon.

Figure 14:
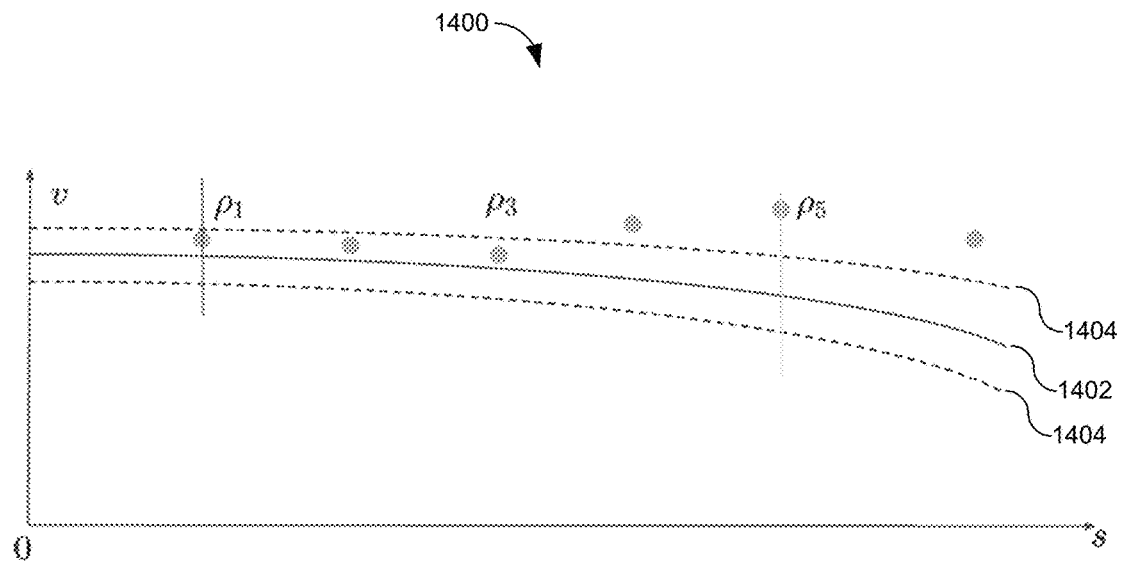
FIGS. 14-15 illustrate an example where target points initially match closely with an ego vehicle coasting profile followed by high speed values, according to some embodiments of the present technology.
Figure 15:
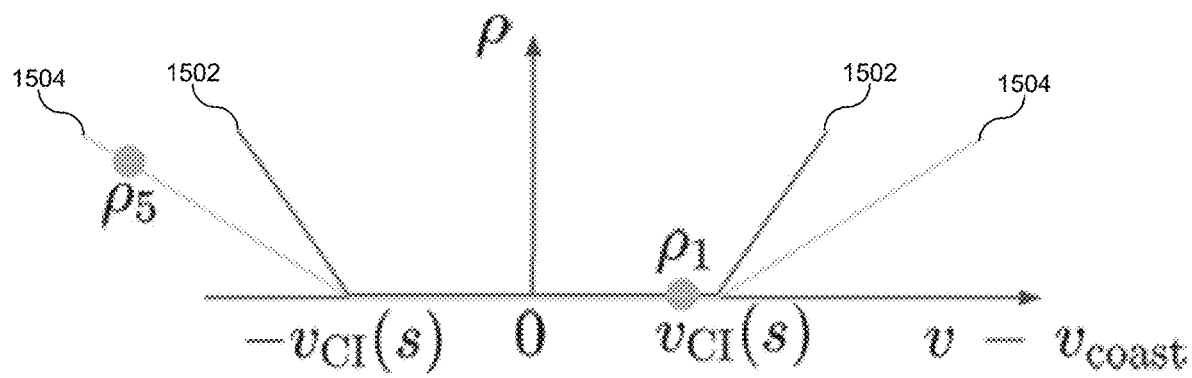

FIGS. 14 and 15 illustrate an example where target points initially match closely with an ego vehicle coasting profile followed by high speed values, according to some embodiments of the present technology. FIG. 14 illustrates a station-speed profile 1400 for this example. FIG. 15 illustrates two example coasting functions 1502 and 1504 for the target points ρ1 and ρ5, respectively. Referring to FIG. 14, target points ρ1 through ρ3 fall within an envelope 1404 defined by the ego vehicle coasting profile 1402 and a confidence interval $v_{CI}(s)$. Accordingly, the ego vehicle should coast initially, but may accelerate soon.

Figure 16:
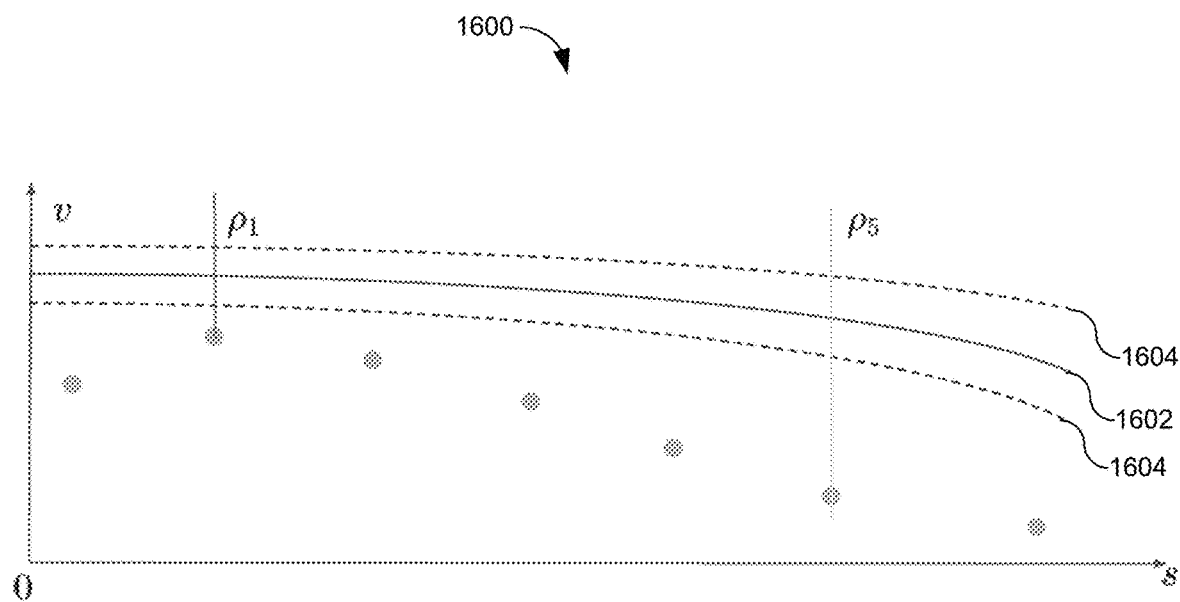
FIGS. 16-17 illustrate an example where target points indicate slow speeds that do not match an ego vehicle coasting profile, according to some embodiments of the present technology.
Figure 17:
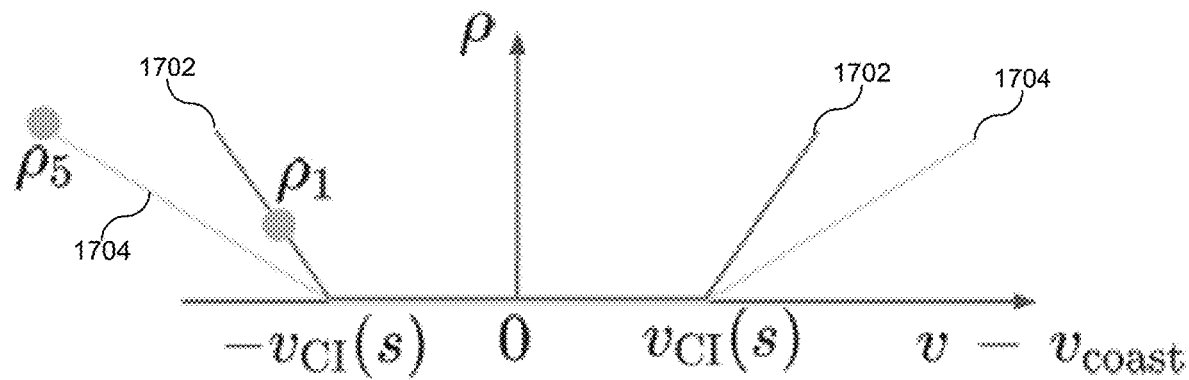

FIGS. 16 and 17 illustrate an example where target points indicate slow speeds that do not match the ego vehicle coasting profile, according to some embodiments of the present technology. FIG. 16 illustrates a station-speed profile 1600 for this example. FIG. 17 illustrates two example coasting functions 1702 and 1704 for the target points ρ1 and ρ5, respectively. Referring to FIG. 16, all of the target points fall outside and below an envelope 1604 defined by the ego vehicle coasting profile 1602 and a confidence interval $v_{CI}(s)$. Accordingly, the ego vehicle may not coast initially, and instead may need to brake to slow down.

It is contemplated that there can be many other uses, applications, and/or variations associated with the various embodiments of the present technology. For example, various embodiments of the present technology can learn, improve, and/or be refined over time.

Example Implementations

Figure 18:
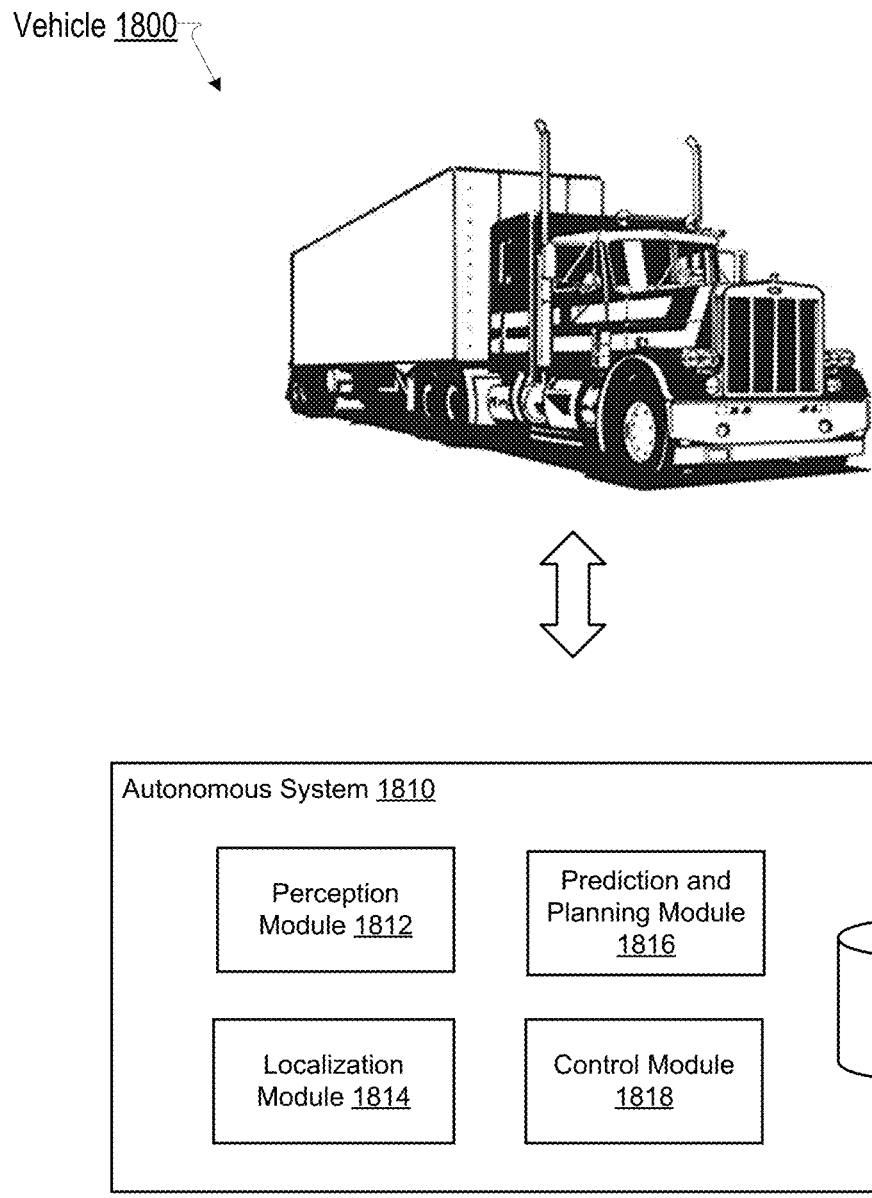
FIG. 18 illustrates a vehicle including an autonomous system, according to various embodiments of the present technology.

FIG. 18 illustrates a vehicle 1800 including an autonomous system 1810, according to various embodiments of the present technology. The functionality and operation of the present technology, including the autonomous system 1810, can be implemented in whole or in part by the vehicle 1800. The present technology can cause desired control and navigation of the vehicle 1800, as described herein. In some embodiments, the vehicle 1800 is a truck, which can include a trailer. The truck can be of any size (e.g., medium truck, heavy truck, very heavy truck, etc.) or weight (e.g., greater than 14,000 pounds, greater than 26,000 pounds, greater than 190,000 pounds, etc.). The autonomous system 1810 of the vehicle 1800 can support and execute various modes of navigation of the vehicle 1800. The autonomous system 1810 can support and execute an autonomous driving mode, a semi-autonomous driving mode, and a driver assisted driving mode of the vehicle 1800. The autonomous system 1810 also can enable a manual driving mode. For operation of the vehicle 1800, the autonomous system 1810 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 1810 can include, for example, a perception module 1812, a localization module 1814, a prediction and planning module 1816, and a control module 1818. The functionality of the perception module 1812, the localization module 1814, the prediction and planning module 1816, and the control module 1818 of the autonomous system 1810 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 1810 can be implemented in any suitable combinations.

The perception module 1812 can receive and analyze various types of data about an environment in which the vehicle 1800 is located. Through analysis of the various types of data, the perception module 1812 can perceive the environment of the vehicle 1800 and provide the vehicle 1800 with critical information so that planning of navigation of the vehicle 1800 is safe and effective. For example, the perception module 1812 can determine the pose, trajectories, size, shape, and type of obstacles in the environment of the vehicle 1800. Various models, such as machine learning models, can be utilized in such determinations.

The various types of data received by the perception module 1812 can be any data that is supportive of the functionality and operation of the present technology. For example, the data can be attributes of the vehicle 1800, such as location, velocity, acceleration, weight, and height of the vehicle 1800. As another example, the data can relate to topographical features in the environment of the vehicle 1800, such as traffic lights, road signs, lane markers, landmarks, buildings, structures, trees, curbs, bodies of water, etc. As yet another example, the data can be attributes of dynamic obstacles in the surroundings of the vehicle 1800, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 1800 to optimize the collection of data. The data also can be captured by sensors that are not mounted on or in the vehicle 1800, such as data captured by another vehicle (e.g., another truck) or by non-vehicular sensors located in the environment of the vehicle 1800.

The localization module 1814 can determine the pose of the vehicle 1800. Pose of the vehicle 1800 can be determined in relation to a map of an environment in which the vehicle 1800 is traveling. Based on data received by the vehicle 1800, the localization module 1814 can determine distances and directions of features in the environment of the vehicle 1800. The localization module 1814 can compare features detected in the data with features in a map (e.g., HD map) to determine the pose of the vehicle 1800 in relation to the map. The features in the map can include, for example, traffic lights, crosswalks, road signs, lanes, road connections, stop lines, etc. The localization module 1814 can allow the vehicle 1800 to determine its location with a high level of precision that supports optimal navigation of the vehicle 1800 through the environment.

The prediction and planning module 1816 can plan motion of the vehicle 1800 from a start location to a destination location. The prediction and planning module 1816 can generate a route plan, which reflects high level objectives, such as selection of different roads to travel from the start location to the destination location. The prediction and planning module 1816 also can generate a behavioral plan with more local focus. For example, a behavioral plan can relate to various actions, such as changing lanes, merging onto an exit lane, turning left, passing another vehicle, etc. In addition, the prediction and planning module 1816 can generate a motion plan for the vehicle 800 that navigates the vehicle 1800 in relation to the predicted location and movement of other obstacles so that collisions are avoided. The prediction and planning module 1816 can perform its planning operations subject to certain constraints. The constraints can be, for example, to ensure safety, to minimize costs, and to enhance comfort.

Based on output from the prediction and planning module 1816, the control module 1818 can generate control signals that can be communicated to different parts of the vehicle 1800 to implement planned vehicle movement. The control module 1818 can provide control signals as commands to actuator subsystems of the vehicle 1800 to generate desired movement. The actuator subsystems can perform various functions of the vehicle 1800, such as braking, acceleration, steering, signaling, etc.

The autonomous system 1810 can include a data store 1820. The data store 1820 can be configured to store and maintain information that supports and enables operation of the vehicle 1800 and functionality of the autonomous system 1810. The information can include, for example, instructions to perform the functionality of the autonomous system 1810, data captured by sensors, data received from a remote computing system, parameter values reflecting vehicle states, map data, machine learning models, algorithms, vehicle operation rules and constraints, navigation plans, etc.

The autonomous system 1810 of the vehicle 1800 can communicate over a communications network with other computing systems to support navigation of the vehicle 1800. The communications network can be any suitable network through which data can be transferred between computing systems. Communications over the communications network involving the vehicle 1800 can be performed in real time (or near real time) to support navigation of the vehicle 1800.

The autonomous system 1810 can communicate with a remote computing system (e.g., server, server farm, peer computing system) over the communications network. The remote computing system can include an autonomous system, and perform some or all of the functionality of the autonomous system 1810. In some embodiments, the functionality of the autonomous system 1810 can be distributed between the vehicle 1800 and the remote computing system to support navigation of the vehicle 1800. For example, some functionality of the autonomous system 1810 can be performed by the remote computing system and other functionality of the autonomous system 1810 can be performed by the vehicle 1800. In some embodiments, a fleet of vehicles including the vehicle 1800 can communicate data captured by the fleet to a remote computing system controlled by a provider of fleet management services. The remote computing system in turn can aggregate and process the data captured by the fleet. The processed data can be selectively communicated to the fleet, including vehicle 1800, to assist in navigation of the fleet as well as the vehicle 1800 in particular. In some embodiments, the autonomous system 1810 of the vehicle 1800 can directly communicate with a remote computing system of another vehicle. For example, data captured by the other vehicle can be provided to the vehicle 1800 to support navigation of the vehicle 1800, and vice versa. The vehicle 1800 and the other vehicle can be owned by the same entity in some instances. In other instances, the vehicle 1800 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 19:
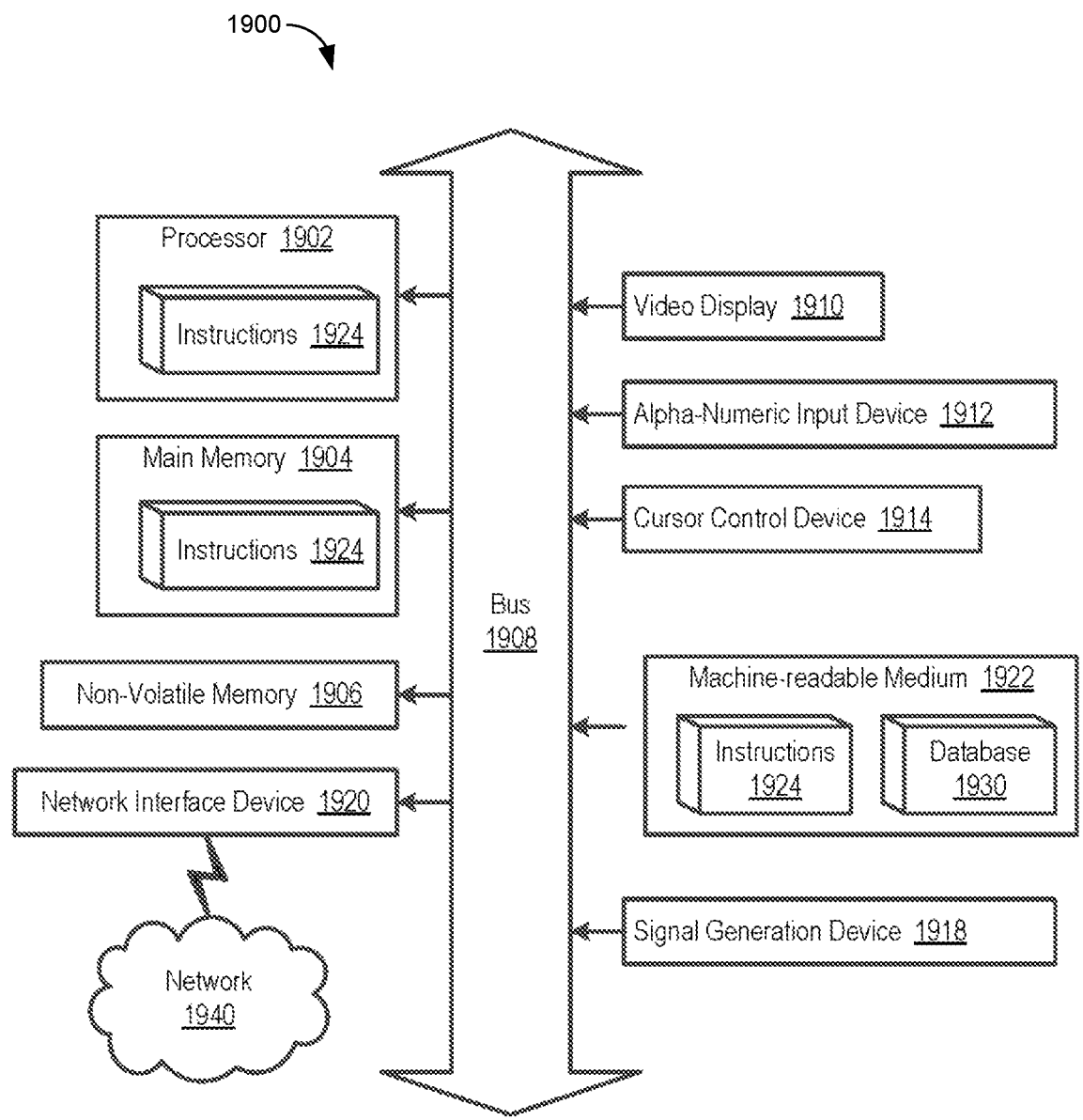
FIG. 19 illustrates an example computing system, according to embodiments of the present technology.

FIG. 19 illustrates an example of a computer system 1900 that may be used to implement one or more of the embodiments of the present technology. The computer system 1900 can be included in a wide variety of local and remote machine and computer system architectures and in a wide variety of network and computing environments that can implement the functionalities of the present technology. The computer system 1900 includes sets of instructions 1924 for causing the computer system 1900 to perform the functionality, features, and operations discussed herein. The computer system 1900 may be connected (e.g., networked) to other machines and/or computer systems. In a networked deployment, the computer system 1900 may operate in the capacity of a server or a client machine in a client-server network environment, or as a peer machine in a peer-to-peer (or distributed) network environment.

The computer system 1900 includes a processor 1902 (e.g., a central processing unit (CPU), a graphics processing unit (GPU), or both), a main memory 1904, and a nonvolatile memory 1906 (e.g., volatile RAM and non-volatile RAM, respectively), which communicate with each other via a bus 1908. In some embodiments, the computer system 1900 can be a desktop computer, a laptop computer, personal digital assistant (PDA), or mobile phone, for example. In one embodiment, the computer system 1900 also includes a video display 1910, an alphanumeric input device 1912 (e.g., a keyboard), a cursor control device 1914 (e.g., a mouse), a signal generation device 1918 (e.g., a speaker) and a network interface device 1920.

In one embodiment, the video display 1910 includes a touch sensitive screen for user input. In one embodiment, the touch sensitive screen is used instead of a keyboard and mouse. A machine-readable medium 1922 can store one or more sets of instructions 1924 (e.g., software) embodying any one or more of the methodologies, functions, or operations described herein. The instructions 1924 can also reside, completely or at least partially, within the main memory 1904 and/or within the processor 1902 during execution thereof by the computer system 1900. The instructions 1924 can further be transmitted or received over a network 1940 via the network interface device 1920. In some embodiments, the machine-readable medium 1922 also includes a database 1930.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1906 may also be a random access memory. The non-volatile memory 1906 can be a local device coupled directly to the rest of the components in the computer system 1900. A non-volatile memory that is remote from the system, such as a network storage device coupled to any of the computer systems described herein through a network interface such as a modem or Ethernet interface, can also be used.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1900 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1900 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not for other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    determining, by a computing system, speeds and stations of a plurality of leading vehicles traveling ahead of an ego vehicle;
    calculating, by the computing system, target points for the ego vehicle, the target points representing predicted coasting speeds for the ego vehicle at the stations of the plurality of leading vehicles at a predetermined future time;
    calculating, by the computing system, coasting functions for the target points based on the stations of the target points and differences between the speeds of the leading vehicles at the stations of the target points and the predicted coasting speeds of the ego vehicle at the stations of the target points;
    calculating, by the computing system, a coasting viability factor by calculating a sum of the coasting functions;
    comparing, by the computing system, the coasting viability factor to a coasting viability threshold;
    determining, by the computing system, whether the ego vehicle should coast based on the comparing; and
    responsive to determining the ego vehicle should coast, causing, by the computing system, the ego vehicle to coast.

2. The computer-implemented method of claim 1, wherein calculating the coasting viability factor comprises:
    calculating a time-station profile based on the speeds and stations of the plurality of leading vehicles and the speed and station of the ego vehicle, the time-station profile representing speeds and stations of the plurality of leading vehicles at the predetermined future time.

3. The computer-implemented method of claim 2, wherein calculating the coasting viability factor further comprises:
    calculating a station-speed profile based on the time-station profile; and
    calculating the coasting viability factor based on the station-speed profile.

4. The computer-implemented method of claim 3, wherein calculating the station-speed profile based on the time-station profile comprises:
    calculating a coasting profile for the ego vehicle based on a current speed of the ego vehicle, wherein the coasting profile represents predicted coasting speeds of the ego vehicle as a function of stations of the ego vehicle.

5. The computer-implemented method of claim 4, wherein calculating the coasting viability factor further comprises:
    calculating the coasting functions for the target points as functions of confidence intervals for the stations of the target points.

6. The computer-implemented method of claim 1, wherein determining whether the ego vehicle should coast comprises:
    determining the ego vehicle should coast when the sum of the coasting functions does not exceed the coasting viability threshold.

7. The computer-implemented method of claim 1, wherein causing the ego vehicle to coast comprises:
generating control signals that cause the ego vehicle to coast.

8. A system comprising:
at least one processor; and
a memory storing instructions that, when executed by the at least one processor, cause the system to perform operations comprising:
determining speeds and stations of a plurality of leading vehicles traveling ahead of an ego vehicle;
calculating target points for the ego vehicle, the target points representing predicted coasting speeds for the ego vehicle at the stations of the plurality of leading vehicles at a predetermined future time;
calculating coasting functions for the target points based on the stations of the target points and differences between the speeds of the leading vehicles at the stations of the target points and the predicted coasting speeds of the ego vehicle at the stations of the target points;
calculating a coasting viability factor by calculating a sum of the coasting functions;
comparing the coasting viability factor to a coasting viability threshold;
determining whether the ego vehicle should coast based on the comparing; and
responsive to determining the ego vehicle should coast, causing, by the computing system, the ego vehicle to coast.

9. The system of claim 8, wherein calculating the coasting viability factor comprises:
calculating a time-station profile based on the speeds and stations of the plurality of leading vehicles and the speed and station of the ego vehicle, the time-station profile representing stations and speeds of the plurality of leading vehicles at the predetermined future time.

10. The system of claim 9, wherein calculating the coasting viability factor further comprises:
calculating a station-speed profile based on the time-station profile; and
calculating the coasting viability factor based on the station-speed profile.

11. The system of claim 10, wherein calculating the station-speed profile based on the time-station profile comprises:
calculating a coasting profile for the ego vehicle based on a current speed of the ego vehicle, wherein the coasting profile represents predicted coasting speeds of the ego vehicle as a function of stations of the ego vehicle.

12. The system of claim 11, wherein calculating the coasting viability factor further comprises:
calculating the coasting functions for the target points as functions of confidence intervals for the stations of the target points.

13. The system of claim 8, wherein determining whether the ego vehicle should coast comprises:
determining the ego vehicle should coast when the sum of the coasting functions does not exceed the coasting viability threshold.

14. The system of claim 8, wherein causing the ego vehicle to coast comprises:
generating control signals that cause the ego vehicle to coast.

15. A non-transitory computer-readable storage medium including instructions that, when executed by at least one processor of a computing system, cause the computing system to perform operations comprising:
determining speeds and stations of a plurality of leading vehicles traveling ahead of an ego vehicle;
calculating target points for the ego vehicle, the target points representing predicted coasting speeds for the ego vehicle at the stations of the plurality of leading vehicles at a predetermined future time;
calculating coasting functions for the target points based on the stations of the target points and differences between the speeds of the leading vehicles at the stations of the target points and the predicted coasting speeds of the ego vehicle at the stations of the target points;
calculating a coasting viability factor by calculating a sum of the coasting functions;
comparing the coasting viability factor to a coasting viability threshold;
determining whether the ego vehicle should coast based on the comparing; and
responsive to determining the ego vehicle should coast, causing the ego vehicle to coast.

16. The non-transitory computer-readable storage medium of claim 15, wherein calculating the coasting viability factor comprises:
calculating a time-station profile based on the speeds and stations of the plurality of leading vehicles and the speed and station of the ego vehicle, the time-station profile representing stations and speeds of the plurality of leading vehicles at a predetermined future time.

17. The non-transitory computer-readable storage medium of claim 16, wherein calculating the coasting viability factor further comprises:
calculating a station-speed profile based on the time-station profile; and
calculating the coasting viability factor based on the station-speed profile.

18. The non-transitory computer-readable storage medium of claim 17, wherein calculating the station-speed profile based on the time-station profile comprises:
calculating a coasting profile for the ego vehicle based on a current speed of the ego vehicle, wherein the coasting profile represents predicted coasting speeds of the ego vehicle as a function of stations of the ego vehicle.

19. The non-transitory computer-readable storage medium of claim 18, wherein calculating the coasting viability factor further comprises:
calculating the coasting functions for the target points as functions of confidence intervals for the stations of the target points.

20. The non-transitory computer-readable storage medium of claim 15, wherein determining whether the ego vehicle should coast comprises:
determining the ego vehicle should coast when the sum of the coasting functions does not exceed the coasting viability threshold.

* * * * *